(12) United States Patent
Kravitz et al.

(10) Patent No.: US 8,080,297 B2
(45) Date of Patent: Dec. 20, 2011

(54) BARRIER COATINGS FOR FILMS AND STRUCTURES

(75) Inventors: Howard S. Kravitz, Wayne, PA (US); Fred Levitt, Wayne, PA (US)

(73) Assignee: NanoPack, Inc., Wayne, PA (US)

( * ) Notice: Subject to any disclaimer, the term of this patent is extended or adjusted under 35 U.S.C. 154(b) by 712 days.

(21) Appl. No.: 11/742,138

(22) Filed: Apr. 30, 2007

(65) Prior Publication Data

US 2007/0254160 A1 Nov. 1, 2007

Related U.S. Application Data

(60) Provisional application No. 60/746,074, filed on May 1, 2006.

(51) Int. Cl.
*B32B 27/18* (2006.01)
*B32B 27/20* (2006.01)
*B32B 27/26* (2006.01)
*B32B 27/30* (2006.01)
*B32B 27/36* (2006.01)

(52) U.S. Cl. ...... 428/36.6; 428/25.4; 428/323; 428/328; 428/330; 428/331; 428/343; 428/346; 428/347; 428/349; 428/355 EN; 428/474.4; 428/475.5; 428/475.8; 428/476.1; 428/480; 428/483; 428/500; 428/507; 428/511; 428/515; 428/516; 428/518; 428/520; 428/522; 428/523; 524/442; 524/444; 524/445; 524/450; 524/456; 524/492; 524/493; 106/626; 106/635; 106/636

(58) Field of Classification Search .......... None
See application file for complete search history.

(56) References Cited

U.S. PATENT DOCUMENTS

| | | | | |
|---|---|---|---|---|
| 4,425,465 A | * | 1/1984 | Padget et al. | 524/450 |
| 4,426,272 A | * | 1/1984 | Hanmer | 204/296 |
| 4,806,590 A | * | 2/1989 | Padget et al. | 524/568 |
| 4,810,734 A | * | 3/1989 | Kawasumi et al. | 523/216 |
| 4,818,788 A | * | 4/1989 | Sato et al. | 525/62 |
| 4,889,885 A | * | 12/1989 | Usuki et al. | 524/445 |
| 5,102,464 A | * | 4/1992 | Ou | 106/415 |
| 5,244,729 A | | 9/1993 | Harrison et al. | 428/331 |
| 5,326,500 A | * | 7/1994 | Friedman et al. | 252/378 R |
| 5,336,348 A | * | 8/1994 | Mindler | 156/231 |
| 5,571,614 A | | 11/1996 | Harrison et al. | 428/331 |
| 5,578,672 A | * | 11/1996 | Beall et al. | 524/446 |
| 5,700,560 A | | 12/1997 | Kotani et al. | |
| 5,840,825 A | | 11/1998 | Carlblom et al. | 528/183 |
| 5,942,298 A | * | 8/1999 | Sakaya et al. | 428/36.6 |
| 5,955,535 A | * | 9/1999 | Vaia et al. | 524/791 |
| 6,068,991 A | | 5/2000 | Liu et al. | 435/69.1 |
| 6,071,624 A | | 6/2000 | Hubbard et al. | 428/446 |
| 6,087,016 A | | 7/2000 | Feeney et al. | 428/454 |
| 6,232,389 B1 | | 5/2001 | Feeney et al. | 524/450 |
| 6,368,677 B2 | | 4/2002 | Hubbard et al. | 427/534 |
| 6,410,635 B1 | * | 6/2002 | Kaylo et al. | 524/447 |
| 6,475,581 B2 | | 11/2002 | Lustig et al. | 428/36.6 |
| 6,815,489 B1 | * | 11/2004 | Fischer et al. | 524/447 |
| 6,927,267 B1 | * | 8/2005 | Varela de la Rosa et al. | 526/287 |
| 6,969,422 B2 | * | 11/2005 | Mazany et al. | 106/600 |
| 7,072,248 B2 | | 7/2006 | Gohil | 368/327 |
| 7,078,453 B1 | | 7/2006 | Feeney et al. | 524/493 |
| 7,119,138 B1 | | 10/2006 | Feeney et al. | 524/450 |
| 7,135,508 B2 | * | 11/2006 | Chaiko et al. | 523/216 |
| 7,410,703 B2 | * | 8/2008 | Giraud et al. | 428/447 |
| 7,595,362 B2 | * | 9/2009 | Kawabe et al. | 525/132 |
| 2005/0059765 A1 | * | 3/2005 | Finch et al. | 524/430 |
| 2005/0228104 A1 | | 10/2005 | Feeney et al. | 524/445 |
| 2006/0110615 A1 | | 5/2006 | Karim et al. | 428/500 |

FOREIGN PATENT DOCUMENTS

| | | |
|---|---|---|
| EP | 0125815 | 11/1984 |
| EP | 0590263 | 4/1994 |
| JP | 11-246729 | * 9/1999 |
| JP | 2001-302986 | 10/2001 |
| JP | 2002-293984 | 10/2002 |
| JP | 2003-165956 | 6/2003 |
| WO | WO98/03860 | 1/1998 |
| WO | WO 98/56861 | 12/1998 |
| WO | WO 00/49072 A1 | 8/2000 |
| WO | WO 2005/017016 | 2/2005 |
| WO | WO 2005/073264 | * 8/2005 |

OTHER PUBLICATIONS

Ogata, et al., J. Appl. Polym. Sci., 1997, 66, 573-581.
Xu, et al., J. Appl. Polym. Sci., 2003, Part B, 41, 749-755.
"Notice of Opposition", Application No. EP 07776576.6, Feb. 7, 2011, 25 pages.
English Translation of JP 2002-293984, Oct. 9, 2002, Topy Ind. Ltd., 16 pages.
English Translation of JP 2003-165956, Jun. 10, 2003, Topy Ind. Ltd., 24 pages.
English Translation of JP-2001-302986, Oct. 31, 2001, Topy Ind. Ltd., 20 pages.
Grace & Co., "Vermiculife Dispersions", Plastics Engineering, Jul. 1988, 1 page.
Grace & Co., "MicroLite Vermiculite Disparisons", Grace Construction Products, Sep. 3, 2003, 3 pages.
Grace Speciality Chemicals Co., "Grace Introduces Vermiculite Dispersions", Gale Group, May 1988, 1 page.

* cited by examiner

*Primary Examiner* — Vivian Chen
(74) *Attorney, Agent, or Firm* — Woodcock Washburn, LLP

(57) ABSTRACT

The invention provides coated substrates comprising a substrate; and a coating on at least one surface of the substrate comprising vermiculite, polymer capable of forming a film, dispersion agent for the vermiculite in the polymer, said dispersion agent bearing a negative charge, and cross-linking agent. The invention also provides articles coated with such coatings and methods for making the coated substrates and articles.

25 Claims, No Drawings

BARRIER COATINGS FOR FILMS AND STRUCTURES

RELATED APPLICATIONS

This application claims the benefit of U.S. Provisional Application No. 60/746,074 filed May 1, 2006.

FIELD OF THE INVENTION

The invention relates to barrier coating containing vermiculite, films and shaped articles containing such coatings, and methods of making such coatings, films and articles.

BACKGROUND OF THE INVENTION

Barrier coatings are widely used in packaging materials to prevent the passage of a permeant molecule or composition, especially to prevent contact between the contents of a package and the permeant. Improving barrier properties is an important goal for manufacturers of films sold for containment of products such as foods, cosmetics, agricultural chemicals, and pharmaceuticals. Injurious permeant chemicals of interest include oxygen, carbon dioxide, water vapor, aromatic and aliphatic hydrocarbons, manufacturing residues, off odors, off flavors, smoke, pesticides, toxic materials, and environmental contaminants and pollutants. Use of typical plastic materials is desirable because they are inexpensive. Plastics, however, are oxygen-permeable to such a degree that the amount of oxygen permeated is much higher than a metal or glass material as used in canning or bottling, or foil used with paper for packaging soup mixes and dry snacks, all of which have an oxygen permeability of substantially zero.

Barrier coatings can also serve to (a) keep a gas inside a package—e.g., a gas used in modified atmosphere packaging, or helium kept inside balloons; (b) keep moisture inside a package so that the contents do not dehydrate; or (c) keep a perfume inside a package, where perfumes can be expensive components. In all these cases, the barrier is maintaining the packaged contents.

Barrier properties arise from both the structure and the composition of the material. The order of the structure, i.e., the crystallinity or the amorphous nature of the material, the existence of layers or coatings can affect barrier properties. The barrier property of many materials can be increased by using liquid crystal or self-ordering molecular technology, by axially orienting materials such as an ethylene vinyl alcohol film, or by biaxially orienting nylon films and by using other useful structures. Internal polymeric structure can be crystallized or ordered in a way to increase the resistance to permeation of a permeant. A material may be selected for a plastic or paper packaging coating that prevents absorption of a permeant onto the barrier surface, and a material may be selected to prevent the transport of the permeant through the barrier. Generally, permeation is concentration and temperature dependent. Permeability is also a function of pressure, where a gradient exists between atmospheric pressure and the structure surrounded by a coated film, etc., e.g., balloons (positive pressure) and vacuum packaging (negative pressure).

Permeation through a polymeric coating is believed to be a multi-step event. First, collision of the permeant molecule, such as oxygen, with the polymer is followed by sorption into the polymer. The permeant migrates through the polymer matrix along a random path, and finally the permeant desorbs from the polymer. The process reaches equilibrium (chemical concentration and pressure) on both sides of the coating. Permeability of a typical molecule through a packaging film is a function of diffusion rate and solubility of the molecule. The diffusion rate measures how rapidly transport of the molecule occurs through the film, and it relates to the ease with which a permeant molecule moves within a polymer. Solubility relates to the concentration or total amount of permeant that may be present in the film. Diffusion and solubility are important measurements of barrier coating performance. Transfer of vapors through packaging films may occur by capillary flow or activated diffusion. Capillary flow involves small molecules permeating through pinholes or microscopic channels of porous media, which is generally an undesirable feature of a barrier coating. Activated diffusion entails solubilization of a permeant into an effectively non-porous medium, diffusion through the film under a concentration gradient, and release from a transverse surface at a lower concentration. Several factors determine the ability of a permeant molecule to permeate through a barrier coating, including size, shape, and chemical nature of the permeant, physical and chemical properties of the polymer, and interactions between the permeant and the polymer.

Various transparent plastic materials having unsatisfactory gas barrier properties are known. Films consisting of a thermoplastic resin, oriented films of polypropylene, polyester, polyamide or the like typically have excellent mechanical properties, heat resistance, transparency and the like and are widely used as packaging materials. However, when these films are used for packaging foods or other goods, they are unsatisfactory for high barrier requirements to oxygen and other gases. Typical barrier materials are a single layer of polymer, a bilayer co-extruded or laminated polymer film, a coated monolayer, or a bilayer or multilayer film having one or more coatings on a surface or both surfaces. The most widely used barrier polymers for food packaging are ethylene-vinyl alcohol copolymers ("EVOH"), ethylene vinyl acetate copolymers ("EVA"), and polyvinylidene chloride terpolymers ("PVDC"), which offer some resistance to permeation of gases, flavors, aromas, and solvents. PVDC also offers some resistance to moisture. EVOH copolymer resins are available in a wide variety of grades having varying ethylene concentrations. As the EVOH content is increased relative to the polyethylene content, the barrier properties to gases, flavors, and solvents increase. EVOH resins are commonly used in coextrusions or laminations with polyolefins such as polyethylene and polypropylene as structural and/or sealant layers, and with nylon, polyethylene terephthalate ("PET"), poly(lactic acid) ("PLA"), or polyhydroxyalkanoate ("PHA") as structural layers. PVDC emulsions are applied as micron-thick rotogravure coatings to various base film structures such as PET, nylon, polypropylene, poly(lactic acid) ("PLA"), or polyhydroxyalkanoate ("PHA"). Other barrier technologies include metallization with thin coatings of aluminum to various base film structures using vacuum deposition. Moderate barrier polymer materials such as monolayer polyethylene terephthalate, polymethyl pentene, and polyvinyl chloride ("PVC") films are commercially available.

Still other barrier films have been achieved with very thin plasma vapor depositions of oxides of silicon or aluminum (several nanometers thick) on base films and molded polymer structures.

Another barrier technology involves the use of oxygen absorbers or scavengers that are used in polymeric coatings or in bulk polymer materials. Metallic reducing agents such as ferrous compounds and powdered oxide or metallic platinum can be incorporated into barrier systems, which scavenge oxygen by converting it into a stable oxide within the film.

Non-metallic oxygen scavengers have also been developed and are intended to alleviate problems associated with metal or metallic tastes or odors. Such systems include compounds including ascorbic acid and various salts and organometallic compounds that have a natural affinity for oxygen. Such molecules absorb oxygen molecules into the interior polymer chemical structure removing oxygen from the internal or enclosed space of packaging materials. Such materials are expensive and, in some cases, the presence of hazardous antioxidants chemicals limits their application.

Another method for imparting gas barrier properties includes dispersing an inorganic material in a resin. Micron-thin polymeric coatings incorporate nano-scale particulate dispersions of clays, such as montmorillonite, hectorite, sodium terasililic mica, sodium taeniolite, and vermiculite into various water-solubilized or emulsified polymers. For example, montmorillonite, hectorite, sodium terasililic mica, or sodium taeniolite may be blended into polyvinyl alcohol. Similarly, polyvinyl alcohol/poly(acrylic acid) blends with these clays are known. In order to prevent clay or vermiculite particles from aggregating or precipitating from solution while mixed with such polymers, it must be extensively pre-treated with, for example, acetic acid or glycine. Still, it is difficult to maintain vermiculite particles in suspension.

Finally, attempts to create barrier by direct addition of various clay particles in extruded and blown thermoplastic films and molded articles are common, but have only modest improvements in barrier impermeability versus orders of magnitude improvement using the aforementioned clay-containing coatings.

SUMMARY OF THE INVENTION

In some embodiments, the invention concerns coated films comprising a base film; and a coating on at least one surface of the base film comprising:
(a) vermiculite;
(b) polymer capable of forming a film;
(c) a dispersion agent (or combinations of dispersion agents) for the vermiculite in the polymer, said dispersion agent(s) bearing a negative charge; and
(d) a cross-linking agent.

Preferred polymers capable of forming films include polyhydroxylic polymer, urethane-containing polymer, rubber, and PVDC. In some preferred embodiments, urethane or rubber would be utilized in an aqueous emulsion. In some embodiments, PVDC would be utilized in emulsion form.

Suitable rubbers include polychloroprene, butyl rubber, and nitrile rubber. In certain embodiments, the polyhydroxylic composition is polyvinyl alcohol. In another embodiment, the polyhydroxylic polymer which may be used is polyvinyl alcohol/ethylene vinyl alcohol (PVOH/EVOH) polymer.

Some preferred vermiculite has an aspect ratio of greater than 5,000 and preferably greater than 10,000. In some embodiments, the amount of vermiculite is 5 to 65% of the weight of the combined weight of the polymer and the crosslinker.

A variety of dispersion agents can be used in the invention. Suitable dispersion agents include sodium xylene sulfonate, ammonium zirconium carbonate, anionic polyethylene wax, sodium salt of polyaspartic acid, anionic carnauba wax, or blends thereof.

In some embodiments, the cross-linking agent is ethanedial, cyclic urea glyoxal condensate, ammonium zirconium carbonate, or blends thereof.

The invention is also applicable to a variety of base films. These films include polyethylene terephthalate, glycolised polyester (PET-G), nylon, biaxially oriented polypropylene, oriented polypropylene, cast polypropylene, polystyrene, polyethylene, polyvinyl chloride, polylactic acid (PLA), polyhydroxyalkanoate (PHA), and polyvinyl chloride. The invention is also applicable to other substrates such as paper.

In some embodiments, the films, articles, and the like of the invention include a sealant film contacting the coating. In some embodiments, the sealant covers essentially all of the coating. Suitable sealant films include polyethylene, various forms of polypropylene, polylactic acid and polyhydroxyalkanoate. These films include variations on the compositions such as low density polyethylene (LDPE) and high density polyethylene (HDPE).

In some embodiments, the films, articles, and compositions of the invention are useful in packaging food, beverages, medicaments, cosmetics, and other air sensitive materials. In certain preferred embodiments, the components are FDA approved or FDA approvable for direct and indirect contact with food, medicaments, or the like.

The invention also relates to compositions comprising (a) water; (b) vermiculite suspended therein; (c) polymer capable of forming a film; (d) at least one dispersion agent for the vermiculite in the polymer, said dispersion agent bearing a negative charge; and (e) at least one cross-linking agent.

In other embodiments, the invention concerns coated shaped bodies where the coating comprises (a) vermiculite; (b) polymer capable of forming a film; (c) at least one dispersion agent for the vermiculite in the polymer, said dispersion agent bearing a negative charge; and (d) at least one cross-linking agent.

In yet other embodiments, the invention relates to articles of manufacture comprising at least one laminate, said laminate comprising: (a) vermiculite; (b) polymer capable of forming a film; (c) at least one dispersion agent for the vermiculite in the polymer, said dispersion agent bearing a negative charge; and (d) at least one cross-linking agent.

In still other embodiments, the invention concerns methods of making a coated film composition comprising:
mixing an aqueous suspension of vermiculite with a solution comprising (a) polymer comprising polyhydroxylic polymer, urethane-containing polymer, rubber, or PVDC; (b) at least one dispersion agent or mixture of dispersion agents and (c) at least one cross-linking agent to form a second suspension; and
coating a substrate with said second suspension.

The invention also relates to methods of stabilizing a suspension comprising vermiculite against shear comprising use of one or more cross-linking agents, in a mixture additionally comprising (a) vermiculite; (b) polymer capable of forming a film; and (c) dispersion agent for the vermiculite, said dispersion agent bearing a negative charge.

DETAILED DESCRIPTION OF ILLUSTRATIVE EMBODIMENTS

The invention concerns coated films and articles, compositions for such coatings, and methods of coating a substrate where the coating comprises vermiculite; polymer capable of forming a film; dispersion agent(s) for the vermiculite in the polymer, said dispersion agent(s) bearing a negative charge; and cross-linking agent(s). It should be noted that, in some embodiments, a majority of the cross-linking agent is reacted with the polymer capable of forming a film.

In some embodiments, a reagent can perform more than one function. For example, ammonium zirconium carbonate is both a dispersing agent and a cross-linking agent for PVOH.

In some embodiments, the substrate is a base film. The invention is applicable to numerous base films. For example, a barrier coating composition of the invention can be applied to various blown, cast, extruded, etc. films or articles manufactured from polymeric materials selected from polyethylene terephthalate ("PET"); biaxially-oriented polypropylene ("BOPP") and oriented polypropylene ("OPP"); cast polypropylene, polyethylene ("PE"), including high density polyethylene ("HDPE"), low density polyethylene ("LDPE"), and linear low density polyethylene ("LLDPE"); polyvinyl chloride ("PVC"), polystyrene ("PS"), biaxially oriented polystyrene, and expanded polystyrene ("EPS"); polyethylene terephthalate glycol ("PET-G"); ethylene vinyl acetate ("EVA"); ethylene vinyl alcohol ("EVOH"); polyhydroxyalkanoate ("PHA"), polylactic acid ("PLA"); and others, such as poly(acrylonitrile-co-butadiene-co-styrene) polymers, acrylic polymers such as polymethylmethacrylate, poly-n-butyl acrylate, poly(ethylene-co-acrylic acid), poly (ethylene-co-methacrylate); cellophane, cellulosics including cellulose acetate, cellulose acetate propionate, cellulose acetate butyrate and cellulose triacetate; fluoropolymers including polytetrafluoroethylene (for example, Teflon, a registered trademark of DuPont), poly(ethylene-co-tetrafluoroethylene) copolymers, (tetra-fluoroethylene-co-propylene) copolymers, polyvinyl fluoride polymers; polyamides such as nylon-6 and nylon-6,6, including biaxially oriented nylon; polycarbonates; polyesters such as poly(ethylene-co-terephthalate), poly(ethylene-co-1,4-naphthalene dicarboxylate), poly(butylene-co-terephthalate); polyimide materials; vinyl films including (vinyl chloride-co-vinyl acetate) copolymers, polyvinylidene chloride, polyvinyl alcohol ("PVOH"), (vinyl chloride-co-vinylidene dichloride) copolymers; and specialty films including polysulfone, polyphenylene sulfide, polyphenylene oxide, liquid crystal polyesters, polyether ketones, and the like.

A film is a flat unsupported section of a polymeric (e.g., plastic) resin whose thickness is much smaller than its width or length. Films are generally regarded as being 0.25 millimeters or less, typically 0.01 to 0.20 mm thick. A sheet may range from about 0.20 mm to several cm, typically 0.3 to 3 mm in thickness. Films and sheets can be used alone or in combination with other sheet, fabric or structural units through lamination, coextrusion or coating. Important properties include tensile strength, elongation, stiffness, tear strength and resistance; optical properties including haze, transparency; chemical resistance such as water absorption and transmission of a variety of permeant materials including water vapor and other permeants; electrical properties such as dielectric constant; and permanence properties including shrinkage, cracking, weatherability, etc. Polymer materials can be formed into a film using a variety of processes including blown polymer extrusion, linear biaxially oriented film extrusion and by casting from molten polymer resin, monomer or polymer (aqueous or organic solvent) dispersion. These methods are well known manufacturing procedures. Skilled artisans can tailor the polymer for a particular end use by controlling molecular weight (the melt index has been selected by the polymer industry as a measure of molecular weight—melt index is inversely proportional to molecular weight, density and crystallinity).

A barrier coating composition of the invention may also be applied to a cast article, or an article made my injection molding or blow molding (such as bottles and other closures), thermoforming (e.g., trays), or stamping (e.g., trays). For casting, molten polymer resin or monomer dispersion are typically produced from polyethylene or polypropylene. Occasionally, nylon, polyester and PVC are cast. For roll coating of aqueous based acrylic urethane and PVDC, etc., dispersions are polymerized to an optimum crystallinity and molecular weight before coating. The coating composition of the invention may also be applied to bottles and trays, which are commonly made with PET, polypropylene and polystyrene. Further, a film can be used as a film closure on a rigid plastic container. Such containers can have a rectangular, circular, square, or other shaped cross-section, a flat bottom and an open top. Further, the invention may be used in the formation of blister pack packaging, clam shell type enclosures, tubs, trays, lidding and similar articles of containment. Examples of use include, but are not limited to, bottles, trays, caps, corks, gloves, and condoms.

Often two or more polymer materials are joined in a coextrusion process to produce tailored film or sheet products adapted to a particular end use. One or more polymer types in two or more layers of melt are melted in separate extruders and joined together in a single coextrusion die layering single extrudates together in a single film to have a finished film with versatile properties derived from the individual layers. Layers of the different polymers or resins can be combined by parallel extrusion of the different polymers. The film can be processed conventionally and may be oriented after cooling. Films can contain a variety of additives such as antioxidants, heat stabilizers, UV stabilizers, slip agents, fillers, and antiblock agents.

Alternatively, another film process puts layers together by lamination. Still other structures might be a combination of an extrusion on top of a solid film and a co-extrusion on top of a solid film.

In addition to a film, the barrier coating composition of the invention may also be applied to an article of paper, fabric, fiber, or other material of manufacture. For example, a barrier coating may be applied to a variety of packaging formats to package a variety of items. For example, items may be packaged entirely in a pouch or bag of paper, fabric or other material of manufacture that is coated with a barrier coating of the invention. Paper products include any article of manufacture, at least a portion of which comprises paper coated in accordance with the invention.

The coated paper product may be made totally of paper or partially of paper. The invention encompasses paper products made of either single or multiple layers, e.g., a paper laminate or plastic/paper laminate. In such constructions, plastic coatings are commonly extruded onto paper; clays are usually slurries that are applied to paper with a knife coater (blade on top of paper with a certain gap and pressure). The coating may be applied on one or both sides. There are paper products that are coated (clay or polymer), such that the invention could be applied on top of the clay or polymer coating.

Paper products that are designed to receive food would typically be arranged such that the coatings are not in contact with food. In this instance, a sealant layer is placed between the food and the coating layer.

Other paper products to be treated with the composition of the invention or made with paper treated in accordance with the invention include laundry soap boxes, fabric dryer sheet containers, and industrial wraps. Food containers that may also be treated with a composition of the invention include any wrapper, bag, box, cup, or other paper product capable of covering, holding, or containing a food product, whether hot or cold, wet or dry, such as hamburger wrappers, candy wrappers, pizza and cereal boxes, condiments, soup mixes, coffee, spices and bags for potato chips, peanuts and pet food, among others.

The invention is especially advantageously applied to protect a product from contamination from permeant sources outside a packaging material. Protecting food items from contamination by aromatic and aliphatic hydrocarbons, fluorocarbons, ink, and packaging residue, exhaust from transportation equivalent and other internal combustion engines, etc. Similarly, the invention can advantageously be applied to prevent the escape of certain perfumes from the package (especially expensive perfumes) commonly used in a variety of consumer products such as scented paper products, bar soap, scented bath products, cleaners, fabric softeners, detergents, and dry bleaches, disinfectants. The invention can also be applied to packaging of seasonings, spices, coffee, and the like.

Food items are the most common material requiring protection from outside contamination. Further, a variety of materials must be packaged in barrier materials preventing the odor of the material from exiting the package, resulting in the substantial loss of important fragrance notes from packaged materials reducing product value. Further, food odors may readily be transmitted by a variety of packaging materials, attracting insect and rodent pests. Important odors requiring substantial barriers include odors derived from coffee, ready to eat cereal, frozen pizza, cocoa or other chocolate products, dry mix gravies and soups, snack foods (such as potato or corn chips, pretzels, crackers, and popcorn), baked foods, butter or butter-flavor notes, meat products, in particular butter or butter-flavor notes used in the manufacture of microwave popcorn in microwaveable paper containers, fruits and nuts, and so on. Dry pet food (such as dog and cat food, etc.) can also benefit from the invention as it is often important to prevent obnoxious odor from escaping into the environment—in the store and at home.

In other embodiments, it is desired to keep a particular gas within as article of manufacture, such as helium within a balloon, or an inert atmosphere such as nitrogen or argon within a package. Materials that are readily oxidized, such as reactive chemicals, may be packaged in a container in which ambient atmosphere has been replaced with an inert atmosphere, and the invention serves to exclude oxygen and to preserve the contents of the package (including the inert atmosphere).

The barrier coating compositions of the invention may be applied to a film or other article of manufacture using any number of application methods, including Meyer rod; reverse gravure, direct gravure, rotogravure, and reverse rotogravure methods; flexographic printing, slot die, and spraying methods; microgravure methods; roll-coating methods such as two-roll beat coat method, bottom-feeding three-roll reverse coat method and the like; knife or blade coating methods; die coat methods; dip coat methods; bar coating methods; and combinations thereof, as well as other art-recognized techniques. When the substrate is a film or sheet, the coating method preferably comprises coating a solution of the barrier coating composition onto the surface of the substrate followed by the drying of the solution. Further heating during lamination or extrusion coating promotes additional curing of the coating. The coating layer thickness may be varied depending upon the kind of substrate and the desired barrier properties, and, in some embodiments, it is preferably about 10 µm or less, more preferably about 1 µm or less, when dry. There is no lower limit, however, and, in some embodiments, the thickness is preferably 10 nm or more—50 nm, 100 nm, 200 nm, 500 nm, or more, in order to obtain effective gas barrier properties in certain embodiments.

As long as the salutary effects of the invention are not impaired, the barrier coating composition may contain various additives such as ultraviolet absorbers/blockers, coloring agents, antioxidants, flame retardants and the like. In some preferred embodiments, these additives have average particle sizes in the nanometer range or smaller (e.g. colloidal antimony flame retardant; nano-sized titanium dioxide and zinc oxide UV barrier).

Suitable flame retardants include halocarbons such as polybrominated diphenyl ether (PBDEs), polychlorinated biphenyls (PCBs), chlorendic acid derivates (such as dibutyl chlorendate and dimethyl chlorendate), organophosphates, organobromines, and organochlorines. Suitable inorganic compounds can also be utilized. These include aluminum hydroxide, magnesium hydroxide, halogenated phosphorus compounds, red phosphorus, antimony trioxide, antimony pentoxide, boron compounds (such as borates), and tetrakis (hydroxymethyl) phosphonium salts. Additional compounds include paraffins, polybrominated biphenyls (PBB), pentabromodiphenyl ether (pentaBDE), octabromodiphenyl ether (octaBDE), decabromodiphenyl ether (decaBDE), hexabromocyclododecane (HBCD), tri-o-cresyl phosphate, tris(2,3-dibromopropyl)phosphate (TRIS), bis(2,3-dibromopropyl) phosphate, and tris(1-aziridinyl)-phosphine oxide (TEPA). Choice of a particular flame retardant should be based with compatibility and desired properties.

Any suitable UV absorbing material can be used. These materials include the oxides of titanium, zirconium, cerium and tin-doped iridium oxides (such as, titanium dioxide, zirconium dioxide, cerium dioxide, indium tin oxide), and the like.

In addition to the aforementioned additives, additional anionic compounds may be utilized. Any composition that bears a negative charge and provides a useful property to the coating composition can be utilized. Such compounds include functionalized carbon nanotubes. Suitable functional groups include a variety of traditional organic functional groups (such as carboxylic acid groups) as well as inorganic groups (such as anionic magnetic particles or anionic functionalized $TiO_2$). A review of some of possibilities for functionalized nanotubes can be found in Ebbesen, J. Phys. Chem. Sol. 1996; 57(6-8):951-5 and Rakov, Chemistry of Carbon Nanotubes In: Gogotsi Y, editor, Nanomaterials Handbook, Boca Raton, Fla.: CRC Press; 2006, p. 105-75.

Additional anionic additives include compounds such as $TiO_2$ compounded with an anionic component, kaolin clays, anionic dyes and colorants, alumina, and phosphorous-containing acids. It should be noted that the additional anionic component can include anionic forms or anionic functionalized versions of the additives discussed herein.

The invention includes articles of manufacture wherein either the coating or films are subsequently laminated with an additional sealant film or extrusion coated with sealant polymers. The sealant may be applied by any means known in the art. The sealant may be one layer or it may be multiple layers. In some embodiments, the sealant is preferably selected from the group consisting of polyethylene (including linear low density polyethylene, etc.), polypropylene, and ethylene-vinyl acetate copolymer (EV acetate), poly(lactic acid) ("PLA"), polyhydroxyalkanoate ("PHA") or blends thereof Platelets of vermiculite are preferred over other clays because of their high aspect ratio. These vermiculite platelets preferably are 1 to 3 nanometers thick and have a surface dimension (length and/or width) of 10 to 30 microns. High aspect ratios allow numerous platelets to be held in place parallel or nearly parallel to the plane of the coating and within thin layers of coating, while having sufficient breadth to form a tortuous path to traversing molecules, such as of oxygen. An anionic polymer on non-polymeric compound is used to disperse and maintain the dispersion of vermiculite clay. Particles of vermiculite are negatively charged on their surfaces and positively charged on their edges. Without the use of a dispersant, vermiculite particles agglomerate and precipitate in the polymer solution. The use of anionic dispersants overcomes the necessity for lengthy treatment of vermiculite particles with acetic acid or glycine as described in other patents and literature, to functionalize the platelets so they do not agglomerate.

Suitable dispersion agents include those bearing a negative charge to disperse the vermiculite. Some suitable agents include anionic polymers. Such anionic polymers include anionic, water-based polymer such as anionic carnauba wax, paraffin wax, or polyethylene wax. Other dispersion agents are small molecule moieties such as sodium xylene sulfonate, ammonium zirconium carbonate, and the sodium salt of polyaspartic acid. In one embodiment, these dispersion agents are used at a weight ratio of dispersion agent to vermiculite ranges from about 0.02 to about 1.0, preferably about 0.04 to about 0.5. In some embodiments, a blend of dispersion agents can be utilized.

Suitable polymers used in the compositions include those capable of forming films. Films can be formed by rolling out or laying out the polymer (or solution or suspension of polymer) on a surface and allowing it to form the film. Such films can be formed with or without the application of heat. The films can be formed with or without the presence of a solvent for the polymer.

The polymers of the invention can be delivered to the coating composition either neat or in solution. In some embodiments, the solution is an aqueous solution. In other embodiments, a non-aqueous solvent may be used. Non-aqueous solvents include alcohols (such as methanol, ethanol and isopropanol), dimethylsulfoxide, acetone, methyl ethyl ketone (MEK), and hydrocarbons.

The polymers can be delivered in the form of an emulsion in some embodiments. Urethane polymer is one such example. Another example of a useful emulsion that is based on polyvinylidene chloride (PVDC). It should also be noted that many of the rubbers noted throughout the application can also be delivered in the form of emulsions—e.g. butyl, nitrile, SBR, epichlorohydrin, chloroprene, acrylic rubbers, and the like. In some emulsions, the range of solids is from low percentages (commonly several percent) to more commonly high percentages of as high as 55-60 weight percent. In some embodiments, PVDC is at 55-60 weight percent and urethane is at 40+ weight percent. In each of these cases, the solutions may be diluted (down to 5-10 weight percent, in some cases) to permit optimal handling and application of the coating.

While a wide variety of polymers can be used in the coating, their barrier properties will vary with composition. It should be noted that starting with polymers that have good barrier properties absent the instant coatings typically improve barrier properties by several orders of magnitude. However, if the resin is not a good barrier on its own, the barrier will not be improved as much.

Any polymer that forms a film of desired properties can be used with the invention. Some preferred polymers include polyhydroxylic polymer, urethanes, and rubbers. Suitable polyhydroxylic polymers include polyvinyl alcohol (PVOH) and ethylene-vinyl alcohol copolymer (EVOH) and blends thereof. One preferred PVOH is a higher hydrolyzed PVOH which is more crystalline in nature than lower hydrolyzed PVOH. Higher hydrolyzed PVOH is more crystalline and hence has better integrity (defined as better resistance to gas transmission) at higher levels of relative humidity.

PVOH is typically produced by hydrolyzing poly(vinyl acetate). In this reaction, acetate groups of poly(vinyl acetate) are replaced with alcohol groups through a hydrolysis reaction. The more acetate groups that are replaced, the greater the hydrolysis of the PVOH resin. For example, in a 95% hydrolyzed PVOH resin approximately 5% of the acetate groups remain unchanged. Similarly, in a 99% hydrolyzed PVOH resin, approximately 1% of the acetate groups remain unchanged. In the instant invention, PVOH of various degrees of hydrolysis can be used. In some cases, the degree of hydrolysis is greater than or equal to 90%, 95%, or 99%.

Any natural or synthetic rubber that gives desired properties can be used. Suitable rubbers include polychlorprene, butyl rubber, acrylic rubber, and nitrile rubber. Other synthetic rubbers include those derived from isoprene, butadiene, SBR (styrene/butadiene rubber), isobutene/isoprene, and EPDM (ethylene/propylene/butadiene).

Urethane polymers are well known to those skilled in the art. Suitable urethane polymers include those amenable to forming aqueous dispersions.

Urethane-containing polymers include polyurethanes made by techniques known in the art. In some embodiments, a polyisocyanate compound (aromatic and aliphatic) is reacted with a compound having two or more reactive terminal hydrogen atoms. In some embodiments, the isocyanate is a diisocyanate. In some embodiments, tri-functional or higher isocyanates can be utilized alone or in mixtures with diisocyanates. In some embodiments, aliphatic isocyanates are preferred.

Suitable compounds with reactive terminal hydrogens include polyols such as poly(ethylene glycol), poly(propylene glycol), or polyester polyol. These compounds can be reacted with the isocyanate compound either in the presence or absence of catalysts.

In some embodiments, the urethanes can have polar sites attached thereto to promote water compatibility. Such sites include, carboxylic acid, ether, sulfonic, sulfonium, sulfhydryl, and ammonium groups. See, for example, PCT Patent Application No. WO98/03860.

In some embodiments, the polymer can be formed in situ. A urethane, for example, can be made by reacting a polyisocyanate with suitable compounds to form urethane linkages. Such compositions might be useful in various end uses such as adhesives (a two component adhesive, for example).

In some preferred embodiments, the polymers can be cross-linked. Any suitable cross-linking agent that provides desirable properties can be used. Examples of cross-linking agents include ethanedial (Glyoxal 40 from Clariant Corporation, for example), cyclic urea glyoxal condensate (SunRez 700, for example), and ammonium zirconium carbonate. In some embodiments, the amount of cross-linker is 0.1 to 50 percent based on weight of the polymer capable of forming a film.

In some embodiments, the coating composition comprises an aqueous dispersion. In some embodiments, the weight percent of solids is 0.5-10%. In other embodiments, the weight percent of solids is 3-8% or 4-6%.

The invention is illustrated by the following examples which are intended as illustrative and not limiting.

EXAMPLE 1

A batch of 10 percent concentration of PVOH was prepared by dissolving 100 grams of Celvol 107 (Celvol is a trademark of Celanese Corporation) in 900 grams of deionized water at 200° F. Methylparaben was added to the mixture at 0.1 percent of the weight of Celvol, or 0.1 gram to prevent formation of microbes. The solution was heated for 20 minutes before all the PVOH and methylparaben were dissolved. The solution was subsequently cooled and filtered through a 200-mesh screen to remove solid impurities. Concentration was checked using a hand-held refractometer and adjusted to account for the water evaporated during the solubilizing step. The evaporated water was replaced with de-ionized water so that the refractometer reading was 11.5 BRIX (based on a known relationship of BRIX reading to concentration, a reading of 11.5 BRIX corresponds to 10 percent solids concentration of PVOH in water).

A cup containing 15.5 grams of the 10% Celvol 107 solution was weighed. An additional 24.8 grams of de-ionized water was added to the 10% Celvol 107 solution. To this mixture was added six-tenths of one gram of Michem 62125AM anionic carnauba wax (Michem is the trademark of Michelman, Inc.). The mixture was gently stirred for 5 seconds. To the PVOH/wax mixture was added 5.0 grams of Microlite 963 (Microlite is the trademark of W.R. Grace & Co.—Conn., and Microlite 963 is a 7.5 percent by weight suspension of vermiculite in water). The mixture was stirred for 5 seconds to disperse the vermiculite particles. A noticeable swirl of particulates was observed, indicating the aligning of platelets, as the swirling motion lined up the surfaces of the platelets in parallel to the current of the mixture. To this mixture was added 2.0 grams of Glyoxal 40 L from Clariant Corporation (Glyoxal 40 L is the product designation used by Clariant for ethanedial). The mixture was stirred gently for 5 seconds. The mixture still exhibited the noticeable swirl of particulates indicating that the singularity of platelets was maintained. Total weight of the solution was 47.9 grams.

The coating described above was at 6.0 percent solids by weight, or 5.0 percent by volume assuming a calculated (dried) coating weight density of 1.2 gms/cc. This coating was diluted to 3.0 percent solids with an additional 47.9 grams of de-ionized water. This solution was applied to a 48 gauge corona-treated PET film with a #15 Meyer rod. Moisture was removed from the coating by drying at 140° F. for one minute with a hand-held air dryer. The coating was further cured at 300° F. for 2 minutes. The thickness of the dried barrier coating was calculated at 0.95 micron, based on the concentration at 3 percent and the amount of wet coating distributed by the Meyer rod at 38.1 microns. The PET film with coating had an oxygen transmission rate ("OTR") of 0.004 cc/100 in$^2$-day-atmosphere at 0% relative humidity using an Ox-Tran 2/16 (Ox-Tran is a registered trademark of MOCON Corporation).

EXAMPLE 2

A batch of 9.565 percent concentration of PVOH was prepared by dissolving 100 pounds of Celvol 107 (Celvol is a trademark of Celanese Corporation) in 900 pounds of de-ionized water at 190 to 205° F. Methylparaben was added to mixture at 0.1 percent of the weight of Celvol, or 0.1 pound to prevent formation of microbes. The solution was heated for 45 minutes until all the PVOH and methylparaben were dissolved. The solution was subsequently cooled and filtered through an 80-mesh screen to remove solid impurities. Concentration was checked using a hand-held refractometer and adjusted to account for the water evaporated during the solubilizing step. The evaporated water was replaced with de-ionized water so that the refractometer reading was 11.0 BRIX. (A reading of 11.0 BRIX corresponds to a PVOH concentration of 9.565 percent based on a known relationship of BRIX reading to concentration, where Concentration of PVOH=1.15×BRIX.)

A coating masterbatch was prepared by mixing 1805.8 grams of the 9.565 percent PVOH solution with 1510.9 grams of de-ionized water. To this mixture was added 37.6 grams of Michem 62125AM anionic carnauba wax (Michem is the trademark of Michelman, Inc.). The mixture was gently stirred for 5 seconds. To this mixture was further added 125.4 grams of Glyoxal 40 from Clariant Corporation (Glyoxal 40 L is the product designation used by Clariant for ethanedial). This mixture was gently stirred for 10 seconds. This masterbatch was transported to an off-site laboratory together with a separate container containing 313.5 grams of Microlite 963 (Microlite is the trademark of W.R. Grace & Co.—Conn., and Microlite 963 is a 7.5 percent by weight suspension of vermiculite in water).

Once at the laboratory site, the masterbatch and clay platelets were mixed together and applied to a 92 gauge, corona-treated PET film with a 12-inch wide Nordmeccanica Labo Combi rotogravure coater using a 110 line analox gravure cylinder running at 30 meters (98.4 feet) per minute. A doctor blade was engaged against the analox cylinder to maintain consistent coating volume applied to the film. The coating was dried through a continuous 12-foot dryer at 210° F. The resulting coating weight was measured at 0.0055 grams per 100 cm$^2$, or a thickness of 0.46 micron, using a calculated density of the dried coating at 1.2 g/cc. The resulting oxygen transmission rate of this coating was measured at 0.008 cc/100 in$^2$-day-atmosphere at 0% relative humidity and 23° C. using an Ox-Tran 2/16 (Ox-Tran is a registered trademark of MOCON Corporation).

EXAMPLE 3

The coating prepared in Example 2 was coated on the same rotogravure coater using the same conditions with the exception that a 200 line analox cylinder was used in place of 110 line analox cylinder.

The resulting coating weight was measured at 0.0036 grams per 100 cm$^2$, or a thickness of 0.30 micron, using a calculated density of the dried coating at 1.2 g/cc. The resulting oxygen transmission rate of this coating was measured at 0.074 cc/100 in$^2$-day-atmosphere at 0% relative humidity and 23° C. using an Ox-Tran 2/16.

EXAMPLE 4

A batch of 9.565 percent concentration of PVOH was prepared by dissolving 100 pounds of Celvol 107 (Celvol is a trademark of Celanese Corporation) in 900 pounds of de-ionized water at 190 to 205° F. Methylparaben was added to the mixture at 0.1 percent of the weight of Celvol, or 0.1 pound to prevent formation of microbes. The solution was heated for 45 minutes before all the PVOH and methylparaben were dissolved. The solution was subsequently cooled and filtered through a 80-mesh screen to remove solid impurities. Concentration was checked using a hand-held refractometer and adjusted to account for the water evaporated during the solubilizing step. The evaporated water was replaced with de-ionized water so that the refractometer reading was 11.0 BRIX (A reading of 11.0 BRIX corresponds to a PVOH concentration of 9.565 percent based on a known relationship of BRIX reading to concentration, where the concentration of PVOH=1.15×BRIX.)

A coating masterbatch was prepared by mixing 6437 grams of the 9.565 percent PVOH solution with 9603 grams of de-ionized water. To this mixture was added 239 grams of Michem 62125AM anionic carnauba wax (Michem is the trademark of Michelman, Inc.).The mixture was gently stirred for 20 seconds. To this mixture was further added 797 grams of Glyoxal 40 from Clariant Corporation (Glyoxal 40 L is the product designation used by Clariant for ethanedial).

This mixture was gently stirred for 20 seconds. This masterbatch was placed into a 5-gallon container and transported to an off-site production facility together with a separate container containing 5 gallons of Microlite 963 (Microlite is the trademark of W.R. Grace & Co.—Conn., and Microlite 963 is a 7.5 percent by weight suspension of vermiculite in water).

Once at the production facility, the 5-gallon container of the masterbatch and 1992.5 grams of clay platelets were mixed together and placed into a reservoir next to a Dri-Tec waterbased coater laminater, with a machine width of 57 inches. Coating in the reservoir was pumped using a diaphragm pump to a pan in which a 200 line analox cylinder was partially submerged into the coating. A doctor blade applied to the cylinder maintained the correct amount of coating on the cylinder for transfer to a 37-inch wide 48 gauge PET film treated with a corona treater to 50+ dyne-cm. Excess coating from the doctor blade fell to a second pan beneath the pan holding coating for the analox cylinder, and flowed back to the reservoir by gravity. The coating was applied to the PET film at a machine speed of 400 feet per minute. A smoothing bar rotating opposite to the direction of the film was used to improve the uniformity of the coating on the film. A 25-foot dryer operating at 215° F. was used to dry the coating. The resulting coating weight was measured at 0.0026 grams per 100 cm$^2$, or a thickness of 0.22 micron, using a calculated density of the dried coating at 1.2 g/cc. The resulting oxygen transmission rate of this coating was measured at 0.21 cc/100 in$^2$-day-atmosphere at 0% relative humidity and 23° C. using an Ox-Tran 2/16 (Ox-Tran is a registered trademark of MOCON Corporation).

EXAMPLE 5

A batch of 10 percent concentration of PVOH was prepared by dissolving 100 grams of Celvol 107 (Celvol is a trademark of Celanese Corporation) in 900 grams of de-ionized water at 200° F. Methylparaben was added to mixture at 0.1 percent of the weight of Celvol, or 0.1 gram to prevent formation of microbes. The solution was heated for 20 minutes before all the PVOH and methylparaben was dissolved. The solution was subsequently cooled and filtered through a 200-mesh screen to remove solid impurities. Concentration was checked using a hand-held refractometer and adjusted to account for the water evaporated during the solubilizing step. The evaporated water was replaced with de-ionized water so that the refractometer reading was 11.5 BRIX (based on a known relationship of BRIX reading to concentration).

A cup containing 15.5 grams of the 10% Celvol 107 solution was weighed. An additional 23.8 grams of de-ionized water was added to the 10% Celvol 107 solution. To this mixture was added four-tenths of one gram of Magnesium Elektron Inc. (MEI) Bacote 20 (Bacote 20 is the trademark of MEI's Ammonium Zirconium Carbonate). The mixture was gently stirred for 5 seconds. To the PVOH/Bacote 20 mixture was added 5.0 grams of Microlite 963 (Microlite is the trademark of W.R. Grace & Co.—Conn., and Microlite 963 is a 7.5 percent by weight suspension of vermiculite in water). The mixture was stirred for 5 seconds to disperse the vermiculite particles. A noticeable swirl of particulates was observed, indicating the aligning of platelets, as the swirling motion lined up the surfaces of the platelets in parallel to the current of the mixture. To this mixture was added 2.0 grams of Glyoxal 40 L from Clairant Corporation (Glyoxal 40 L is the product designation used by Clariant for ethanedial). The mixture was stirred gently for 5 seconds. The mixture still exhibited the noticeable swirl of particulates indicating that the singularity of platelets was maintained. Total weight of the solution was 46.7 grams.

The coating described above was at 6.0 percent solids. This coating was diluted to 3.0 percent solids with an additional 46.7 grams of de-ionized water. This solution was applied to a 48 gauge corona-treated PET film with a #15 Meyer rod. Moisture was removed from the coating by drying at 140° F. for one minute. The coating was further cured at 300° F. for 2 minutes. The thickness of the dried barrier coating was calculated at 1.14 microns, based on the concentration at 3 percent and the amount of wet coating distributed by the Meyer rod at 38.1 microns. The PET film with coating had an oxygen transmission rate ("OTR") of 0.007 cc/100 in$^2$-day-atmosphere at 0% relative humidity and 23° C. using an Ox-Tran 2/16 (Ox-Tran is a registered trademark of MOCON Corporation).

EXAMPLE 6

A batch of 10 percent concentration of PVOH was prepared by dissolving 100 grams of Celvol E (Celvol is a trademark of Celanese Corporation) in 900 grams of de-ionized water at 200° F. Methylparaben was added to mixture at 0.1 percent of the weight of Celvol, or 0.1 gram to prevent formation of microbes. The solution was heated for 20 minutes before all the PVOH and methylparaben was dissolved. The solution was subsequently cooled and filtered through a 200-mesh screen to remove solid impurities. Concentration was checked using a hand-held refractometer and adjusted to account for the water evaporated during the solubilizing step. The evaporated water was replaced with de-ionized water so that the refractometer reading was 11.5 BRIX (based on a known relationship of BRIX reading to concentration).

A cup containing 15.5 grams of the 10% Celvol E solution was weighed. An additional 24.3 grams of de-ionized water was added to the 10% Celvol E solution. To this mixture was added two-tenths of one gram of Magnesium Elektron Inc. (MEI) Bacote 20 (Bacote 20 is the trademark of MEI's Ammonium Zirconium Carbonate). The mixture was gently stirred for 5 seconds. To the PVOH/Bacote 20 mixture was added 5.0 grams of Microlite 963 (Microlite is the trademark of W.R. Grace & Co.—Conn., and Microlite 963 is a 7.5 percent by weight suspension of vermiculite in water). The mixture was stirred for 5 seconds to disperse the vermiculite particles. A noticeable swirl of particulates was observed, indicating the aligning of platelets, as the swirling motion lined up the surfaces of the platelets in parallel to the current of the mixture. To this mixture was added three-tenths of one gram of Michem 62125AM anionic carnauba wax (Michem is the trademark of Michelman, Inc.). And, finally, to this mixture was added 2.0 grams of Glyoxal 40 L from Clairant Corporation (Glyoxal 40 L is the product designation used by Clariant for ethanedial). The mixture was stirred gently for 5 seconds. The mixture still exhibited the noticeable swirl of particulates indicating that the singularity of platelets was maintained. Total weight of the solution was 47.3 grams.

The coating described above was at 6.0 percent solids by weight, or 5.0 percent by volume assuming a calculated (dried) coating weight density of 1.2 gms/cc. This coating was diluted to 3.0 percent solids with an additional 47.3 grams of de-ionized water. This solution was applied to a 48 gauge corona-treated PET film with a #15 Meyer rod. Moisture was removed from the coating by drying at 140° F. for one minute. The coating was further cured at 300° F. for 2 minutes. The thickness of the dried barrier coating was calculated at 0.95 micron, based on the concentration at 3 percent and the amount of wet coating distributed by the Meyer rod at 38.1 microns. The PET film with coating had an oxygen transmission rate ("OTR") of 0.007 cc/100 in$^2$-day-atmosphere at 0% relative humidity and 23° C. using an Ox-Tran 2/16 (Ox-Tran is a registered trademark of MOCON Corporation).

EXAMPLE 7

A batch of 10 percent concentration of PVOH was prepared by dissolving 100 grams of Celvol 107 (Celvol is a trademark of Celanese Corporation) in 900 grams of de-ionized water at 200° F. Methylparaben was added to mixture at 0.1 percent of the weight of Celvol, or 0.1 gram to prevent formation of microbes. The solution was heated for 20 minutes before all the PVOH and methylparaben was dissolved. The solution was subsequently cooled and filtered through a 200-mesh screen to remove solid impurities. Concentration was checked using a hand-held refractometer and adjusted to account for the water evaporated during the solubilizing step. The evaporated water was replaced with de-ionized water so that the refractometer reading was 11.5 BRIX (based on a known relationship of BRIX reading to concentration).

Several solutions (Table 1) were formulated similarly to Example 6, but with different levels of Glyoxal 40 L. Where Glyoxal was reduced from the level shown in Example 6, the reduction was replaced with a similar weight of de-ionized water. In this fashion, the total weight of each solution was maintained at 46.8 grams.

TABLE 1

| SAMPLE # | PVOH, 10%, gms | De-ionized water, gms | Bacote 20, gms | Microlite 963, gms | Michem 62125AM, gms | Glyoxal, gms |
|---|---|---|---|---|---|---|
| 1 | 15.5 | 23.8 | 0.2 | 5.0 | 0.3 | 2.0 |
| 2 | 15.5 | 24.8 | 0.2 | 5.0 | 0.3 | 1.0 |
| 3 | 15.5 | 25.3 | 0.2 | 5.0 | 0.3 | 0.5 |
| 4 | 15.5 | 25.6 | 0.2 | 5.0 | 0.3 | 0.2 |

Four cups containing 15.5 grams of the 10% Celvol 107 solution were weighed. De-ionized water was added to each of the 10% Celvol 107 solutions. To each of these mixtures was added two-tenths of one gram of Magnesium Elektron Inc. (MEI) Bacote 20 (Bacote 20 is the trademark of MEI's Ammonium Zirconium Carbonate). The mixtures were gently stirred for 5 seconds. To each of the PVOH/Bacote 20 mixtures was added 5.0 grams of Microlite 963 (Microlite is the trademark of W.R. Grace & Co.—Conn., and Microlite 963 is a 7.5 percent by weight suspension of vermiculite in water). The mixtures were stirred for 5 seconds to disperse the vermiculite particles. A noticeable swirl of particulates was observed, indicating the aligning of platelets, as the swirling motion lined up the surfaces of the platelets in parallel to the current of the mixture. To these mixtures was added three-tenths of one gram of Michem 62125AM anionic carnauba wax (Michem is the trademark of Michelman, Inc.). To these mixtures was added Glyoxal 40 L from Clairant Corporation (Glyoxal 40 L is the product designation used by Clariant for ethanedial), according to the level shown in Table 1 listed in this example. The mixture was stirred gently for 5 seconds. The mixture still exhibited the noticeable swirl of particulates indicating that the singularity of platelets was maintained. Total weight of each of the solution was 46.8 grams.

The coatings described all contained the same levels of PVOH and Microlite vermiculite. Each coating was diluted by adding 15 grams of water to 5 grams of each solution. These solutions were then applied to a 48 gauge corona-treated PET film with a #15 Meyer rod. Moisture was removed from the coatings by drying at 140° F. for one minute. The coatings were further cured at 300° F. for 2 minutes. Based on the percent solids in each coating formulation, the thicknesses of the dried barrier coatings were calculated using these concentrations together with the constant amounts of wet coating distributed by the Meyer rod at 38.1 microns. The PET film with coatings were analyzed for oxygen transmission rate ("OTR") at 0% relative humidity and 23° C. using an Ox-Tran 2/16 (Ox-Tran is a registered trademark of MOCON Corporation). The coating concentrations, thicknesses and OTRs are shown in the Table 2.

TABLE 2

| SAMPLE # | Solids concentration after dilution, % | Coating Thickness, micron | OTR, cc/100 in$^2$-day-atmosphere |
|---|---|---|---|
| 1 | 1.50 | 0.57 | 0.05 |
| 2 | 1.29 | 0.49 | 0.08 |
| 3 | 1.18 | 0.45 | 0.04 |
| 4 | 1.12 | 0.43 | 0.05 |

EXAMPLE 8

A batch of 10 percent concentration of PVOH was prepared by dissolving 100 grams of Celvol 107 (Celvol is a trademark of Celanese Corporation) in 900 grams of de-ionized water at 200° F. Methylparaben was added to mixture at 0.1 percent of the weight of Celvol, or 0.1 gram to prevent formation of microbes. The solution was heated for 20 minutes before all the PVOH and methylparaben was dissolved. The solution was subsequently cooled and filtered through a 200-mesh screen to remove solid impurities. Concentration was checked using a hand-held refractometer and adjusted to account for the water evaporated during the solubilizing step. The evaporated water was replaced with de-ionized water so that the refractometer reading was 11.5 BRIX (based on a known relationship of BRIX reading to concentration).

Several solutions were formulated similarly to Example 6, but with different levels of Glyoxal 40 L. Where Glyoxal was reduced from the level shown in Example 6, the reduction was replaced with a similar weight of de-ionized water. In this fashion, the total weight of each solution was maintained at 46.8 grams.

TABLE 3

| SAMPLE # | PVOH, 10%, gms | De-ionized water, gms | Bacote 20, gms | Microlite 963, gms | Michem 62125AM, gms | Glyoxal. gms |
| --- | --- | --- | --- | --- | --- | --- |
| 1 | 15.5 | 23.8 | 0.2 | 5.0 | 0.3 | 2.0 |
| 2 | 15.5 | 24.8 | 0.2 | 5.0 | 0.3 | 1.0 |
| 3 | 15.5 | 25.3 | 0.2 | 5.0 | 0.3 | 0.5 |
| 4 | 15.5 | 25.6 | 0.2 | 5.0 | 0.3 | 0.2 |
| 5 | 15.5 | 25.7 | 0.2 | 5.0 | 0.3 | 0.1 |
| 6 | 15.5 | 25.8 | 0.2 | 5.0 | 0.3 | 0.0 |

Six cups containing 15.5 grams of the 10% Celvol 107 solution were weighed. De-ionized water was added to each of the 10% Celvol 107 solutions. To each of these mixtures was added two-tenths of one gram of Magnesium Elektron Inc. (MEI) Bacote 20 (Bacote 20 is the trademark of MEI's Ammonium Zirconium Carbonate). The mixtures were gently stirred for 5 seconds. To each of the PVOH/Bacote 20 mixtures was added 5.0 grams of Microlite 963 (Microlite is the trademark of W.R. Grace & Co.—Conn., and Microlite 963 is a 7.5 percent by weight suspension of vermiculite in water). The mixtures were stirred for 5 seconds to disperse the vermiculite particles. A noticeable swirl of particulates was observed, indicating the aligning of platelets, as the swirling motion lined up the surfaces of the platelets in parallel to the current of the mixture. To these mixtures was added three-tenths of one gram of Michem 62125AM anionic carnauba wax (Michem is the trademark of Michelman, Inc.). To these mixtures was added Glyoxal 40 L from Clairant Corporation (Glyoxal 40 L is the product designation used by Clariant for ethanedial), according to the level shown in Table 3. The mixtures were stirred gently for 5 seconds. The mixtures still exhibited the noticeable swirl of particulates indicating that the singularity of platelets was maintained. Total weight of each of the solutions was 46.8 grams.

Each cup of coating was then frothed for 45 seconds using a hand-held Trudeau mixer. The foams then collapsed and the coatings were observed. In each of the mixtures where Glyoxal was used, the resulting mixture showed the swirl of particles, indicating the aligning of platelets. In the mixture where Glyoxal was not used (Sample #6), the mixture contained agglomerated particulates, indicating the shear stability of the mixture was not maintained. Shear stability is important, for example, when applying the coating onto a film, using rotogravure coater; the doctor blade on the analox cylinder creates shear, which can cause the vermiculite platelets to collapse on one another and agglomerate.

EXAMPLE 9

A batch of 10 percent concentration of PVOH was prepared by dissolving 100 grams of Celvol 107 (Celvol is a trademark of Celanese Corporation) in 900 grams of de-ionized water at 200° F. Methylparaben was added to mixture at 0.1 percent of the weight of Celvol, or 0.1 gram to prevent formation of microbes. The solution was heated for 20 minutes before all the PVOH and methylparaben was dissolved. The solution was subsequently cooled and filtered through a 200-mesh screen to remove solid impurities. Concentration was checked using a hand-held refractometer and adjusted to account for the water evaporated during the solubilizing step. The evaporated water was replaced with de-ionized water so that the refractometer reading was 11.5 BRIX (based on a known relationship of BRIX reading to concentration).

A cup containing 15.5 grams of the 10% Celvol 107 solution was weighed. An additional 22.9 grams of de-ionized water was added to the 10% Celvol 107 solution. To this mixture was added 0.05 gram of a 2 percent Sodium Xylene Sulfonate solution (made by diluting 5 grams of 40 percent active solution with 95 grams for de-ionized water). The mixture was gently stirred for 5 seconds. To the PVOH/wax mixture was added 5.0 grams of Microlite 963 (Microlite is the trademark of W.R. Grace & Co.—Conn., and Microlite 963 is a 7.5 percent by weight suspension of vermiculite in water). The mixture was stirred for 5 seconds to disperse the vermiculite particles. A noticeable swirl of particulates was observed, indicating the aligning of platelets, as the swirling motion lined up the surfaces of the platelets in parallel to the current of the mixture. To this mixture was added 2.0 grams of Glyoxal 40 L from Clairant Corporation (Glyoxal 40 L is the product designation used by Clariant for ethanedial). The mixture was stirred gently for 5 seconds. The mixture still exhibited the noticeable swirl of particulates indicating that the singularity of platelets was maintained. Total weight of the solution was 45.4 grams.

The coating described above was at 6.0 percent solids by weight, or 5.0 percent by volume assuming a calculated (dried) coating weight density of 1.2 gms/cc. This coating was diluted to 3.0 percent solids with an additional 45.4 grams of de-ionized water. This solution was applied to a 48 gauge corona-treated PET film with a #15 Meyer rod. Moisture was removed from the coating by drying at 140° F. for one minute. The coating was further cured at 300° F. for 2 minutes. The thickness of the dried barrier coating was calculated at 0.95 micron, based on the concentration at 3 percent and the amount of wet coating distributed by the Meyer rod at 38.1 microns. The PET film with coating had an oxygen transmission rate ("OTR") of 0.004 cc/100 in$^2$-day-atmosphere at 0% relative humidity using an Ox-Tran 2/16 (Ox-Tran is a registered trademark of MOCON Corporation). The PET film with coating had an water vapor transmission rate ("WVTR") of 0.5 g/100 in$^2$-day-atmosphere and 23° C. using PERMATRAN (PERMATRAN is a registered trademark of MOCON Corporation). A comparable thickness film prepared without the Microlite Vermiculite Dispersion had a WVTR of 1.3 g/100 in$^2$-day-atmosphere and 23° C. which is representative of the PET film with no coating.

EXAMPLE 10

A batch of 10 percent concentration of PVOH was prepared by dissolving 100 grams of Celvol 107 (Celvol is a trademark of Celanese Corporation) in 900 grams of de-ionized water at 200° F. Methylparaben was added to mixture at 0.1 percent of the weight of Celvol, or 0.1 gram to prevent formation of microbes. The solution was heated for 20 minutes before all the PVOH and methylparaben was dissolved. The solution was subsequently cooled and filtered through a 200-mesh screen to remove solid impurities. Concentration was checked using a hand-held refractometer and adjusted to account for the water evaporated during the solubilizing step.

The evaporated water was replaced with de-ionized water so that the refractometer reading was 11.5 BRIX (based on a known relationship of BRIX reading to concentration).

A cup containing 15.5 grams of the 10% Celvol 107 solution was weighed. An additional 24.9 grams of de-ionized water was added to the 10% Celvol 107 solution. To this mixture was added 0.1 gram of a 2 percent Sodium Xylene Sulfonate solution (made by diluting 5 grams of 40 percent active solution with 95 grams for de-ionized water). The mixture was gently stirred for 5 seconds. To the PVOH/wax mixture was added 12.5 grams of Microlite 963 (Microlite is the trademark of W.R. Grace & Co.—Conn., and Microlite 963 is a 7.5 percent by weight suspension of vermiculite in water). The mixture was stirred for 5 seconds to disperse the vermiculite particles. A noticeable swirl of particulates was observed, indicating the aligning of platelets, as the swirling motion lined up the surfaces of the platelets in parallel to the current of the mixture. To this mixture was added 2.0 grams of Glyoxal 40 L from Clairant Corporation (Glyoxal 40 L is the product designation used by Clariant for ethanedial). The mixture was stirred gently for 5 seconds. The mixture still exhibited the noticeable swirl of particulates indicating that the singularity of platelets was maintained. Total weight of the solution was 55.0 grams.

The coating described above was at 6.0 percent solids by weight, or 5.0 percent by volume assuming a calculated (dried) coating weight density of 1.2 gms/cc. This coating was diluted to 3.0 percent solids with an additional 55.0 grams of de-ionized water. This solution was applied to a 48 gauge corona-treated PET film with a #15 Meyer rod. Moisture was removed from the coating by drying at 140° F. for one minute. The coating was further cured at 300° F. for 2 minutes. The thickness of the dried barrier coating was calculated at 0.95 micron, based on the concentration at 3 percent and the amount of wet coating distributed by the Meyer rod at 38.1 microns. The PET film with coating had an oxygen transmission rate ("OTR") of 0.0006 cc/100 in$^2$-day-atmosphere at 0% relative humidity and 23° C. using an Ox-Tran 2/16 (Ox-Tran is a registered trademark of MOCON Corporation). The PET film with coating had a water vapor transmission rate ("WVTR") of 0.5 g/100 in$^2$-day-atmosphere and 23° C. using PERMATRAN (PERMATRAN is a registered trademark of MOCON Corporation).

EXAMPLE 11

Ten grams of Witcobond UCX-321 was mixed with 181.5 grams for de-ionized water. (Witcobond is a trademark of Chemtura Corporation.) To this mixture was added 0.1 gram of a 2 percent Sodium Xylene Sulfonate solution (made by diluting 5 grams of 40 percent active solution with 95 grams for de-ionized water). The mixture was gently stirred for 5 seconds. To this mixture was added 12.5 grams of Microlite 963 (Microlite is the trademark of W.R. Grace & Co.—Conn., and Microlite 963 is a 7.5 percent by weight suspension of vermiculite in water). The mixture was stirred for 5 seconds to disperse the vermiculite particles. To this mixture was added 2.0 grams of Glyoxal 40 L from Clairant Corporation (Glyoxal 40 L is the product designation used by Clariant for ethanedial). The mixture was stirred gently for 5 seconds. The resulting mixture was grayish and opaque. Total weight of the solution was 206.1 grams. The resulting mixture was 2.82 percent solids by weight and approximately 2.0 percent solids by volume, using a calculated density of the dried coating at 1.4 gms/cc.

The coating described above was applied to a 48 gauge corona-treated PET film with a #15 Meyer rod. Moisture was removed from the coating by drying at 140° F. for one minute. The coating was further cured at 300° F. for 2 minutes. The thickness of the dried barrier coating was calculated at approximately 0.76 microns. The PET film with coating had a water vapor transmission rate ("WVTR") of 0.7 g/100 in$^2$-day-atmosphere and 23° C. using PERMATRAN (PERMATRAN is a registered trademark of MOCON Corporation). A comparable thickness film prepared without the Microlite Vermiculite Dispersion had a WVTR of 1.3 g/100 in$^2$-day-atmosphere and 23° C., which is representative of the PET film with no coating.

EXAMPLE 12

A batch of 10 percent concentration of PVOH was prepared by dissolving 100 grams of Celvol E (Celvol is a trademark of Celanese Corporation) in 900 grams of de-ionized water at 200° F. Methylparaben was added to the mixture at 0.1 percent of the weight of Celvol, or 0.1 gram to prevent formation of microbes. The solution was heated for 20 minutes before all the PVOH and methylparaben were dissolved. The solution was subsequently cooled and filtered through a 200-mesh screen to remove solid impurities. Concentration was checked using a hand-held refractometer and adjusted to account for the water evaporated during the solubilizing step. The evaporated water was replaced with de-ionized water so that the refractometer reading was 11.5 BRIX (based on a known relationship of BRIX reading to concentration, a reading of 11.5 BRIX corresponds to 10 percent solids concentration of PVOH in water).

A cup containing 15.5 grams of the 10% Celvol E solution was weighed. An additional 23.5 grams of de-ionized water was added to the 10% Celvol E solution. To this mixture was added two-tenths of one gram of Michem 62125AM anionic carnauba wax (Michem is the trademark of Michelman, Inc.). The mixture was gently stirred for 5 seconds. To the PVOH/wax mixture was added 5.0 grams of Microlite 963 (Microlite is the trademark of W.R. Grace & Co.—Conn., and Microlite 963 is a 7.5 percent by weight suspension of vermiculite in water). The mixture was stirred for 5 seconds to disperse the vermiculite particles. A noticeable swirl of particulates was observed, indicating the aligning of platelets, as the swirling motion lined up the surfaces of the platelets in parallel to the current of the mixture. To this mixture was added 2.0 grams of Glyoxal 40 L from Clairant Corporation (Glyoxal 40 L is the product designation used by Clariant for ethanedial). The mixture was stirred gently for 5 seconds. The mixture still exhibited the noticeable swirl of particulates indicating that the singularity of platelets was maintained. Total weight of the solution was 46.2 grams.

The coating described above was at 6.0 percent solids by weight, or 5.0 percent by volume assuming a calculated (dried) coating weight density of 1.2 gms/cc. This coating was diluted to 3.0 percent solids with an additional 46.2 grams of de-ionized water. This solution was applied to a 48 gauge corona-treated PET film with a #15 Meyer rod. Moisture was removed from the coating by drying at 140° F. for one minute with a hand-held air dryer. The coating was further cured at 300° F. for 2 minutes. The thickness of the dried barrier coating was calculated at 0.95 micron, based on the concentration at 3 percent and the amount of wet coating distributed by the Meyer rod at 38.1 microns. The PET film with coating had an oxygen transmission rate ("OTR") of 0.006 cc/100 in$^2$-day-atmosphere at 50% relative humidity and 23° C., and 0.51 cc/100 in$^2$-day-atmosphere at 68% relative humidity and 23° C. using an Ox-Tran 2/16 (Ox-Tran is a registered trademark of MOCON Corporation).

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed:

1. A coated film comprising:
   a base film; and
   a coating on at least one surface of the base film comprising:
   (a) vermiculite;
   (b) polymer capable of forming a film, said polymer comprising polyvinyl alcohol, ethyl vinyl alcohol copolymer, or blends thereof;
   (c) dispersion agent for the vermiculite in the polymer, said dispersion agent being an anionic wax; and
   (d) cross-linking agent;
   wherein the weight ratio of dispersion agent to vermiculite is about 0.02 to about 0.45.

2. The coated film of claim 1, wherein said anionic wax is anionic polyethylene wax, anionic paraffin wax, anionic carnauba wax, or blends thereof.

3. The coated film of claim 1, wherein said anionic wax is anionic carnauba wax or a blend of anionic carnauba wax and anionic polyethylene wax.

4. The coated film of claim 1, wherein said anionic wax is a blend of anionic paraffin wax and anionic polyethylene wax.

5. The coated film of claim 1, wherein said anionic wax is anionic carnauba wax.

6. The coated film of claim 1, wherein the polymer comprises polyvinyl alcohol.

7. The coated film of claim 1, wherein the vermiculite has an aspect ratio of at least 5,000.

8. The coated film of claim 1, wherein the cross-linking agent is ethanedial, cyclic urea glyoxal condensate, or blends thereof; said cross-linking agent being present in an amount of 0.1 to 50 weight percent of the weight of said polymer capable of forming a film.

9. The coated film of claim 1, wherein the base film is polyethylene terephthalate, glycolised polyester (PET-G), nylon, biaxially oriented polypropylene, oriented polypropylene, cast polypropylene, polystyrene, polyethylene, polyvinyl chloride, polylactic acid (PLA), polyhydroxyalkanoate (PHA), polyvinyl chloride, or paper.

10. The coated film of claim 1, further comprising a sealant film contacting the coating.

11. The coated film of claim 10, wherein the sealant film comprises polyethylene or polypropylene.

12. The coated film of claim 1, having components that are FDA approved or FDA approvable for direct and/or indirect contact with food.

13. A composition comprising:
   (a) deionized water;
   (b) vermiculite suspended therein;
   (c) polymer capable of forming a film, said polymer comprising polyvinyl alcohol, ethyl vinyl alcohol copolymer, or blends thereof;
   (d) dispersion agent for the vermiculite in the polymer, said dispersion agent being an anionic wax; and
   (e) cross-linking agent;
   wherein the weight ratio of dispersion agent to vermiculite is about 0.02 to about 0.45.

14. The composition of claim 13, wherein said anionic wax is anionic polyethylene wax, anionic paraffin wax, anionic carnauba wax, or blends thereof.

15. The composition of claim 13, wherein said anionic wax is anionic carnauba wax or a blend of anionic carnauba wax and anionic polyethylene wax.

16. The composition of claim 13, wherein said anionic wax is a blend of anionic paraffin wax and anionic polyethylene wax.

17. The composition of claim 13, wherein said anionic wax is anionic carnauba wax.

18. The composition of claim 13, wherein the polymer comprises polyvinyl alcohol.

19. The composition of claim 13, wherein the cross-linking agent is ethanedial, cyclic urea glyoxal condensate, or blends thereof; said cross-linking agent being present in an amount of 0.1 to 50 weight percent of the weight of said polymer capable of forming a film.

20. A coated shaped body comprising:
   a shaped body; and
   a coating comprising:
   (a) vermiculite;
   (b) polymer capable of forming a film, said polymer comprising polyvinyl alcohol, ethyl vinyl alcohol copolymer, or blends thereof;
   (c) dispersion agent for the vermiculite in the polymer, said dispersion agent being an anionic wax; and
   (d) cross-linking agent;
   wherein the weight ratio of dispersion agent to vermiculite is about 0.02 to about 0.45.

21. The coated shaped body of claim 20, wherein said anionic wax is anionic polyethylene wax, anionic paraffin wax, anionic carnauba wax, or blends thereof.

22. The coated shaped body of claim 20, wherein said anionic wax is anionic carnauba wax or a blend of anionic carnauba wax and anionic polyethylene wax.

23. The coated shaped body of claim 20, wherein said anionic wax is a blend of anionic paraffin wax and anionic polyethylene wax.

24. The coated shaped body of claim 20, wherein the polymer comprises polyvinyl alcohol.

25. The coated shaped body of claim 20, wherein the polymer comprises ethyl vinyl alcohol copolymer.

* * * * *